COUPLING STAGE FOR DISTRIBUTED AMPLIFIERS STAGES

Filed Nov. 15, 1950 2 Sheets-Sheet 1

INVENTOR.
George G. Kelley
BY
Roland A. Anderson
ATTORNEY

Feb. 23, 1954 G. G. KELLEY 2,670,408

COUPLING STAGE FOR DISTRIBUTED AMPLIFIERS STAGES

Filed Nov. 15, 1950 2 Sheets-Sheet 2

INVENTOR.
George G. Kelley
BY
Roland A. Anderson
ATTORNEY

Patented Feb. 23, 1954

2,670,408

UNITED STATES PATENT OFFICE 2,670,408

COUPLING STAGE FOR DISTRIBUTED AMPLIFIER STAGES

George G. Kelley, Oak Ridge, Tenn., assignor to the United States of America as represented by the United States Atomic Energy Commission Application November 15, 1950, Serial No. 195,844

2 Claims. (Cl. 179—171)

Figure 1:
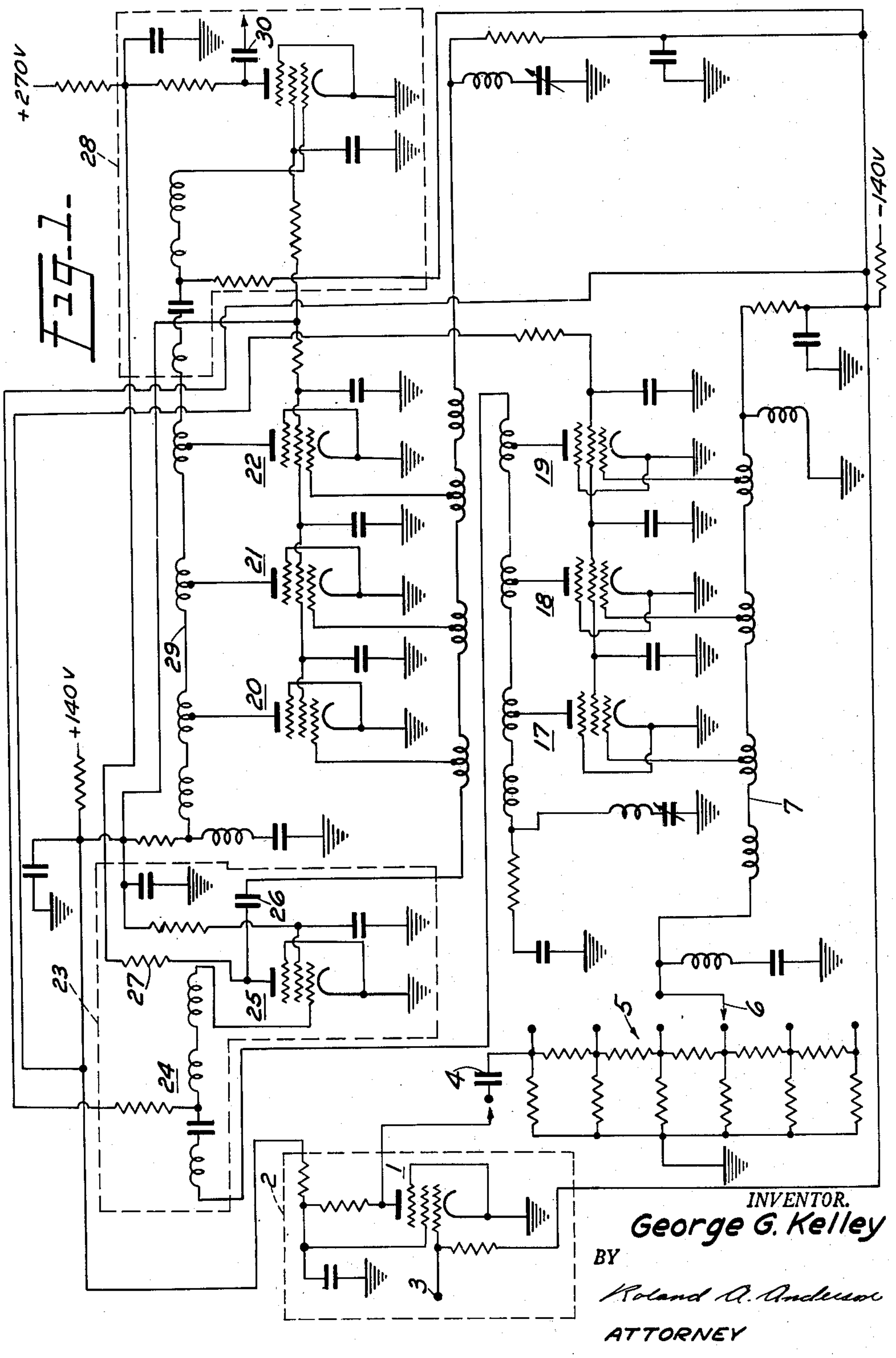

The present invention relates to amplifier systems, and more especially to an improved system utilizing distributed amplification.

The principles of distributed amplification for electrical oscillations covering a wide range of frequencies, including a description of the basic theory of operation of such systems, was presented by Percival in British patent specification 460,562, dated 15 July, 1936. Briefly stated, in conventional amplifiers, the tubes are connected in cascade, the total voltage gain being the product of the gains of each individual tube. To increase the bandwidth, the gain per tube must be reduced, the product of gain and bandwidth having an upper limit for any given tube. Matters are not improved by connecting tubes in parallel because the circuit capacity, which limits the bandwidth, is approximately doubled by the parallel grid-cathode interelectrode capacities. It can be arranged, however, so that a number of tubes are driven, not at the same time, but in sequence by the input signal, with their outputs being delayed appropriately, and then added. This is the principle of distributed amplification. The grid to ground capacities of the tubes form the capacitive elements of a low pass filter, otherwise known as a lumped constant delay line, and coils connected consecutively between the grids are the inductive elements. The plates are connected to another line with the same propagation constant. As a signal wave travels down the grid line it causes a wave to propagate in both directions at each successive plate. The waves in the forward direction add in phase. Those in the reverse direction do not and are absorbed in the terminating resistors. The total gain is the sum of the gains of the individual tubes.

In the prior art, a number of tubes have been paralleled to form a section, and several sections may be cascaded to obtain the required amplifier gain. The sections may be connected simply by joining the plate line of one stage to the grid line of the following stage through a capacitor. The reactance of the coupling capacitor increases at low frequencies, so that it is difficult to extend the low frequency response of such couplings. But by the employment of applicant's novel amplifier arrangement, disclosed hereinafter, satisfactory response of the interstage coupling networks may be extended to a considerably lower frequency, for a given size coupling condenser.

With knowledge of the shortcomings of the systems of the prior art, applicant has for an object of his invention the provision of a distributed amplifier system in which the desired overall gain is maintained, even at low frequencies.

Applicant has as a paramount object of his invention provision of a distributed amplifier system having a voltage gain per stage substantially twice as great as that of systems of the prior art.

Another object of the invention is to provide a novel coupling between the stages of a distributed amplifier whereby the voltage gain per stage is substantially doubled.

A further object of the invention is to provide an amplifier of a selected gain and bandwidth with substantially fewer electron tubes than may be done in circuits of the prior art.

Figure 2:
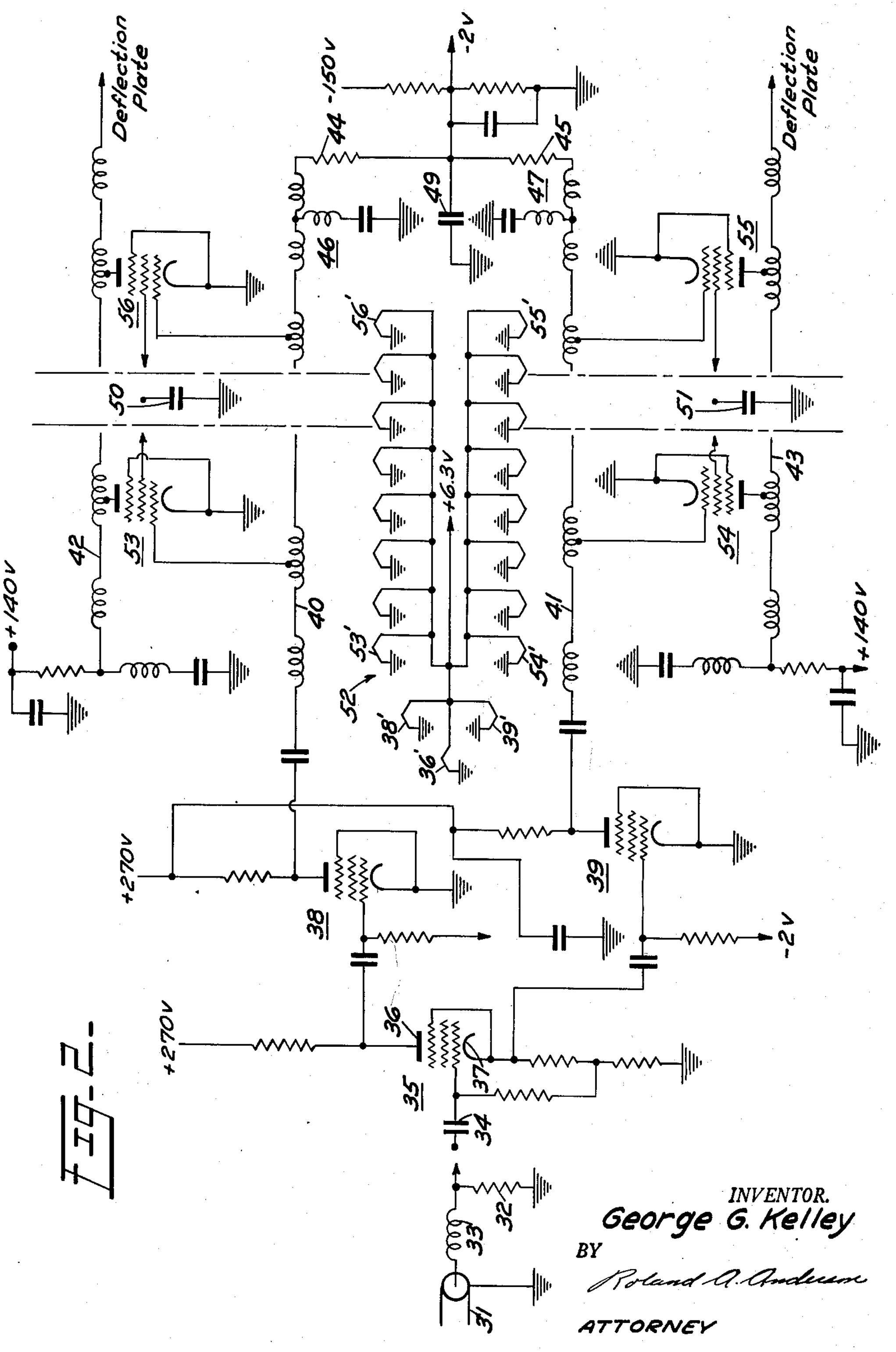

Other objects and advantages of the present invention will become apparent from the following detailed description of a preferred embodiment thereof, together with the appended drawings, in which, Fig. 1 shows a two-stage amplifier wherein the stages are coupled in a novel and improved manner; and Fig. 2 shows a novel single stage of distributed amplification constructed in accordance with the teachings of the present invention.

Referring now to Fig. 1, tube 1, which may be of the type CK5702, is connected in a conventional preamplifier circuit 2 having its input at terminal 3. The preamplifier is coupled through capacitor 4 to attenuator 5, and selector switch 6 connects the attenuator to grid transmission line 7. Tubes 17, 18, 19 comprise the first stage of a cascaded distributed amplifier system, and tubes 20, 21, 22 form the second stage. The stages are connected by a buffer stage 23, which includes filter network 24, tube 25, coupling capacitor 26, and load resistor 27. A similar buffer stage 28 is coupled to the output of plate line 29, and provides the output voltage at the coupling capacitor 30.

Where two output signals are desired, as in operation of a synchroscope to observe fast electrical pulses visually, a signal voltage such as the output voltage at 30 may be applied to a novel two channel distributed amplifier as shown in Fig. 2. Delay line 31 may connect at one end to the capacitor 30 and is terminated at the other end in resistor 32, in series with a small inductance 33. The input signal is coupled through capacitor 34 to an inverter tube 35, and voltages of opposite phase are derived at plate 36 and cathode 37 and applied to driver tubes 38, 39, respectively. Grid lines 40, 41 are capacitively coupled to a respective one of those tubes, and receive signals of opposite phase therefrom. The plate lines 42, 43 are terminated only at their input ends, the outputs being connected directly to the deflection plates of a conventional cathode ray tube. The grid lines 40, 41 are terminated at their output ends through resistors 44, 45, filter networks 46, 47, and capacitor 49. The screen grids of each tube in a stage are connected together and by-passed only at the center of the stage by capacitors 50, 51. These capacitors may be connected between the fourth and fifth tubes of the stages. For brevity, six tubes per stage and the corresponding portions of the grid and plate transmission lines have been omitted, as indicated by the broken lines. Each tube is connected exactly the same as the other tubes in the stage, and there are preferably eight parallel-connected tubes per stage. The grid lines should be shielded from the plate lines to avoid mutual inductance coupling between them.

For clarity, filament and screen grid connections to the electron tubes are not shown in Fig. 1, the filament connections all being made in the conventional manner to appropriate sources of filament current for the tubes employed, and the screen grids each being connected to a source of +140 volts. In Fig. 2, the filament connections are schematically shown at 52, while the screen grids are all connected to a source of +140 volts. Sources of electrical potential for energizing the tube electrodes are indicated conventionally on the drawings by their voltage output magnitudes, and may be of any convenient, relatively stable type known to the art, the exact details thereof forming no part of the present invention. The tubes in each amplification stage may preferably be type 6AK5.

The novel coupling circuits preferably include an electric discharge device of the highest obtainable transconductance characteristic. Moreover, the input and output capacities of the device should be as low as possible, preferably of the order of 4 micromicrofarads. Type 6AK5 pentode has proven to be satisfactory, but other tubes, for example, the 6AG5, 6AU6, and Western Electric 404A, may also be employed. The control grid of a buffer tube may be coupled either to the plate line of the preceding stage through a filter such as filter 24, which is of the conventional type, or directly to the amplifier input, or capacitively to the plate of an inverter stage such as inverter 35. The plate of a buffer tube may be coupled through a capacitor to the following grid line.

All of the lines used in the amplifier are of the "*m*" derived type. Kallmann discusses this type line in connection with the construction of high fidelity delay lines in "Proceedings of the Institute of Radio Engineers," volume 34, page 9. He shows that best results are obtained with an "*m*" of 1.27 and points out that negative mutual inductance may be used to eliminate the need for any inductance in the shunt arm. The method of design proceeds as follows: first, a compromise is arrived at in determining the characteristic impedance $Z_0$ of the plate line between gain per tube and pass band desired in the amplifier. The high frequency cutoff $f_c$ of a delay line varies inversely with the line impedance, and is given by the equation $$f_c=\frac{1}{2Z_0C}$$

where $Z_0$ is the impedance of the line considered to be a pure resistance, and C is the unavoidable shunt capacity of each section, divided by the value of "*m*." The grid line must be designed for the same cutoff frequency as the plate line because the delay per section of both lines must be equal. The required values of the inductance of each coil L and the mutual inductance M, corrected for lead inductance, then may be calculated when $Z_0$, C, and the value of lead inductance M′ are known.

The experimentally determined values of *m*C and M′ are 4.9 micromicrofarads and .021 microhenries, respectively, for a 6AK5 grid line, and 7.2 micromicrofarads and .028 microhenry for a 6AK5 plate line. M is required to be a negative mutual inductance because $1-m^2$ is negative. The successive coils of a line are wound as one continuous center-tapped coil which gives M the proper sign, and permits its magnitude to be controlled easily. The inductance of the two sections in series is increased by a factor $$\frac{L_1+M}{L_1}$$

where L is the inductance of the first section, by the mutual inductance between them. This ratio is fixed in a continuous-wound coil by the ratio of length to diameter. The coils may be close wound if the proper size wire is selected to give the required length. This method was used and the coils were then checked on a "Q" meter and adjusted to the nearest turn.

In every case the plate lines drive a larger capacity than their normal shunt capacity. It is always possible, however, to join two lines so long as they have the same characteristic impedance; therefore, the load capacity is connected to the last regular section of a line through an inductance L whose value is given by $L=\frac{1}{2}R^2C$. Wherever the capacity in a shunt leg is greater than the normal shunt capacity, the half section involved will have a lower cutoff frequency than the rest of the line but the attenuation of one half section is not severe and, while it does reduce the pass band, the alternative of padding all sections of the line up to the value of the maximum capacity and then reducing the line impedance to achieve the same pass band is much less economical of tubes and equipment.

The terminations for the grid and plate lines in the deflection amplifier were adjusted with the aid of a pulse generator having a rise time of about 0.002 microsecond. First, a negative signal was applied directly to the grids of one stage, of sufficient amplitude to cut off the tubes. The deflection plate ordinarily connected to the other stage was grounded and the observed waveform was assumed to be a function only of the plate line. With a wrong value of terminating resistors the output signal will change stepwise from a value $\Delta i_pZ_0$ to a value $\Delta i_pR$, (each step lasting for twice the delay of the line).

It was found that non-inductive wire wound resistors, shunted with carbon resistors to the correct value, were very satisfactory in this application. After the plate line had been adjusted, the stage was returned to normal operation and the grid termination corrected. This problem proved to be a bit more difficult because of the appreciable effect of grid loading. Dissipation along a line requires an inductive component in the termination. This fact, along with the unavoidable presence of capacitive reactance made it necessary to add a small inductance in series with the terminating resistor. Since the grid loading varies with the bias, a compromise had to be made. The best value proved to be about 0.1 microhenry (11 turns of number 26 wire on a 0.1 inch form).

It has heretofore been believed that the artificial transmission lines formed by the electrode capacities and the inductances connected to successive tubes should be terminated at both ends by an impedance equal to the characteristic impedance of the lines, in order to avoid reflections of the signal. If such a line is unterminated or short circuited at its output end, the entire energy incident on that end is reflected back along the line but if the line is terminated in its characteristic impedance, the energy will be completely absorbed in the termination, so that none is reflected back along the line. The effective impedance of a line which is terminated at both input and output ends will be only ½ the characteristic impedance of the line, because the terminating resistors may be considered as being connected in parallel for the low frequency components of a signal. The voltage developed by each tube of a stage is directly proportional to this effective line impedance. I have found that I can avoid certain of the previously required line terminations by providing special novel circuit arrangements, embodiments of which are described above, to couple successive amplifier stages. When I interpose such coupling circuits, I have found that the gain per stage may be increased 100 percent, without reduction of bandwidth, because of the elimination of one line termination resistor, thus doubling the effective impedance of the artificial transmission line, without the deleterious effects obtaining in the circuits of the prior art when lines are not properly terminated.

Comparing now the circuits of Figures 1 and 2 with those of the prior art, the advantages of my novel circuit arrangements will appear. In the prior art, the plate lines of each stage must be terminated at their output ends, either directly through a resistor or indirectly through the grid line of the next stage and its terminating resistor. But by the provision of the buffer stages 23, 28, in the circuit of Figure 1, both the plate lines may be left unterminated without the deleterious effects which improper termination would cause in prior circuits. By this novel arrangement, the gain per stage is increased by 100 percent, providing four times the overall gain previously obtained with a two-stage amplifier. The circuit of Figure 2 is so designed that the grid lines 40, 41 are driven by the buffer tubes 38, 39, and need not be terminated at their input ends. By this arrangement, the low-frequency response of the amplifiers of Figure 2 can be greatly improved. The time constants can be made satisfactorily large by selection of relatively high plate load resistances, for example, 15,000 ohms, for buffer tubes 38, 39, the resistances forming the discharge paths for the coupling capacitors involved.

The response of cascaded amplifiers like those of the prior art will fall off badly at low frequencies because the R-C time constant of the interstage coupling capacitor is very low, the resistances involved being those of the transmission line and its terminating impedance—of the order of 400 ohms. It is apparent therefore that in the circuit of Figure 2, the low frequency response has been improved by a factor of $$\frac{15,000}{400}$$

It is thus apparent that I have greatly improved upon prior cascaded distributed amplifier circuits in achieving a voltage gain per stage twice as great as was previously believed to be available, without sacrifice of bandwidth, in a manner unknown to the prior art, and in further achieving much greater bandwidth by virtue of greatly improved low frequency response.

What is claimed is:

1. In a distributed amplifier comprising a pair of stages, each comprising a plurality of amplifier vacuum tubes interconnected by respective artificial grid and plate transmission lines, each line having a pair of input terminals and a pair of output terminals, means for terminating in their characteristic impedances the input ends of said plate lines and the output ends of said grid lines, and a source of tube energizing potentials, the improvement comprising means for coupling signals between said stages while isolating the output terminals of said plate lines to prevent termination thereof comprising respective coupling tubes each having at least anode, cathode, and grid electrodes, means coupling the grid of each coupling tube to the amplifier tube anodes of the preceding stage through one output terminal of the plate line of said stage, means coupling the cathode of each coupling tube to the other output terminal of said preceding stage plate line and to one input terminal of the grid line of the following stage, and means coupling the anode of each coupling tube to the other input terminal of said following stage grid line, whereby the effective impedance driven by each amplifier tube is maintained at substantially said characteristic impedance.

2. In a distributed amplifier comprising a pair of stages, each comprising a plurality of amplifier vacuum tubes interconnected by respective artificial grid and plate transmission lines, each line having a pair of input terminals and a pair of output terminals, means for terminating in their characteristic impedances the input ends of said plate lines and the output ends of said grid lines, and a source of tube energizing potentials, the improvement comprising means for coupling signals between said stages while isolating the output terminals of said plate lines to prevent termination thereof comprising respective coupling tubes each having at least anode, cathode, and grid electrodes, respective half-sections of said plate line coupling the grid of each coupling tube to the amplifier tube anode of the preceding stage through one output terminal of the plate line of said stage, means coupling the cathode of each coupling tube to the other output terminal of said preceding stage plate line and to one input terminal of the grid line of the following stage, respective load impedances substantially greater than said characteristic impedances coupled between said potential source and each coupling tube anode, and respective coupling condensers coupling the anode of each coupling tube to the other input terminal of said following stage grid line, whereby the effective impedance driven by each amplifier tube is maintained at substantially said characteristic impedance.

GEORGE G. KELLEY.

References Cited in the file of this patent

UNITED STATES PATENTS

| Number | Name | Date |
|---|---|---|
| 2,169,305 | Tunick | Aug. 15, 1939 |
| 2,169,306 | Tunick | Aug. 15, 1939 |
| 2,172,354 | Blumlein | Sept. 12, 1939 |

FOREIGN PATENTS

| Number | Country | Date |
|---|---|---|
| 460,562 | Great Britain | Jan. 25, 1937 |

OTHER REFERENCES

Publication — "Distributed Amplification" by Ginzton et al. Proceedings of the Institute of Radio Engineers—vol. 36, No. 8, August 1948, pp. 956–969.